United States Patent [19]
Wood

[11] Patent Number: 5,733,399
[45] Date of Patent: Mar. 31, 1998

[54] METHOD AND APPARATUS OF MANUFACTURING SYNCHRONOUS DRIVE BELT WITH TEETH WHICH ARE AXIALLY INTERLOCKED WITH A MOLD SURFACE

[75] Inventor: Douglas Bruce Wood, Lincoln, Nebr.

[73] Assignee: The Goodyear Tire & Rubber Company, Akron, Ohio

[21] Appl. No.: 574,422

[22] Filed: Dec. 15, 1995

[51] Int. Cl.⁶ .................... B29D 29/08; F16G 1/28
[52] U.S. Cl. .................. 156/138; 156/141; 264/314; 425/28.1; 474/205; 474/250; 474/266
[58] Field of Search ............... 156/137, 138, 156/139, 140, 141, 142; 425/28.1, 34.2, 43; 264/314, 315, 325, 326; 474/205, 250, 260, 264, 265, 266, 268

[56] References Cited

U.S. PATENT DOCUMENTS

| | | | |
|---|---|---|---|
| 2,600,775 | 6/1952 | Hurry et al. | 18/34 |
| 2,773,540 | 12/1956 | Waugh | 156/138 |
| 3,078,205 | 2/1963 | Sauer et al. | 156/137 |
| 3,078,206 | 2/1963 | Skura | 156/140 |
| 3,485,707 | 12/1969 | Spicer | 474/265 |
| 3,932,078 | 1/1976 | Ellis et al. | 425/43 |
| 4,022,070 | 5/1977 | Wolfe | 156/139 |
| 4,311,474 | 1/1982 | Standley | 156/137 |
| 4,838,843 | 6/1989 | Westhoff | 474/250 |
| 5,209,705 | 5/1993 | Gregg | 474/204 |
| 5,309,738 | 5/1994 | Morris | 66/132 |

FOREIGN PATENT DOCUMENTS

| | | | |
|---|---|---|---|
| 59-133034 | 7/1984 | Japan . | |
| 2106443 | 4/1983 | United Kingdom | 156/138 |

Primary Examiner—Steven D. Maki
Attorney, Agent, or Firm—Roger D. Emerson

[57] ABSTRACT

An apparatus and method for manufacturing a synchronous drive belt or timing belt is disclosed. The method allows a belt with axially interlocked teeth to be manufactured. The method utilizes transfer molding, as opposed to compression molding, and involves an inflatable diaphragm which pushes rubber radially outwardly from a mandrel into a mold having teeth on an inner surface. The method includes the provision of a barrier layer which can be advantageously built into the belt to improve the transfer molding process.

10 Claims, 7 Drawing Sheets

METHOD AND APPARATUS OF MANUFACTURING SYNCHRONOUS DRIVE BELT WITH TEETH WHICH ARE AXIALLY INTERLOCKED WITH A MOLD SURFACE

BACKGROUND OF THE INVENTION

1. Field of Invention

This invention relates to synchronous drive belts and timing belts and more specifically to a method and apparatus for manufacturing a synchronous drive belt having teeth which are axially interlocked with the mold surface.

2. Description of the Related Art

U.S. Pat. No. 5,209,705 to Gregg ostensibly discloses a synchronous drive belt with oblique and offset teeth.

U.S. Pat. No. 3,078,206 to Skura ostensibly discloses a method of forming belt teeth and reinforced positive drive belts.

U.S. Pat. No. 2,600,775 ostensibly discloses a method and apparatus for making and curing power transmissions belts.

Finally, Japanese Patent No. 59-133,034 is also directed to a method of manufacturing a synchronous drive belt.

Synchronous drive belts are generally made of a resilient elastomer and are reinforced with a longitudinal tensile member which lies along the pitch line of the belt and is made up of a plurality of cords of a high elastic modulus. The cords may be made from glass fiber, carbon fiber, steel, polyester, high tenacity rayon or preferably, polyamide. The tooth surface may be reinforced with an abrasion resistant fabric, one example of which is nylon. The elastomers may be any one of those known to be suitable for use in such belts, including polychloroprene, polyurethane, NBR, IIR, IR, SBR, CSM, EPDM, other thermosets, thermoplastic elastomers and other polymer alloys.

It is known to make non-synchronous belts "inside-out" on a flat cylindrical mandrel. Materials used to manufacture the belt are wrapped around the mandrel and the mandrel is placed inside a cylindrical diaphragm in a vulcanizer. The diaphragm is inflated and presses radially inwardly on the belt during the curing process. The cured belt or slab is then machined on its outer surface to form flanks or ribs and to separate the individual belts from each other before they are turned "right side out."

Ring cured belts are made by several processes. In one process, individual unvulcanized belts are placed in mold cavities formed by stacking mating rings. The cavities are open at their inside diameter. During the vulcanization process, the mold is placed around the outside of a diaphragm and retainer and the assembly is placed in a vulcanizer. The diaphragm is expanded and pushes radially outwardly against the opening of the mold cavity, pressing the belt against the mold.

Belts known as Poly-V® belts for appliances are built inside out on a collapsible mandrel. The belts are removed from the mandrel and placed (often by hand as this step is difficult to automate) inside a cylindrical mold which has circumferential grooves on an inside surface. An internal diaphragm and retainer is then placed inside the unvulcanized belt or slab. The diaphragm forces the slab radially outwardly into the grooves during cure. After cure, the diaphragm is removed and the slab is buckled radially inwardly to disengage the molded ribs from grooves in the mold. Then the slab is removed axially.

Snowmobile tracks have been made by a similar method, using an internal diaphragm or segmented, expanding internal mold. However, the method of manufacturing Poly-V® belts or snowmobile tracks has not been previously suitable for the manufacture of timing belts and other synchronous belts, due to the high precision required in such belts which are not required in snowmobile tracks or Poly-V® belts.

Collapsible mandrels and manual alignment of the slab in an inside-out mold has not previously rendered a precision product such as is required for synchronous belt applications. Instead, the required precision and accuracy is usually achieved with an internal mold having teeth on its outer cylindrical surface and which is accurately machined from one piece of metal. The mold is placed in a building machine and the materials are wound around the mold. After the unvulcanized belt has been built, the mold is placed inside a curing diaphragm which pushes radially inwardly on the slab during cure.

This radially inwardly directed pushing can be accomplished through compression molding or a radially inward transfer molding process. It is generally desirable to place the cord of a timing belt as close as possible to the tops of the belt tooth spaces, and to support it with the tops of the molded teeth during molding and curing.

In the compression molding process, the materials which are wound around the mandrel before the cord being wound around the mandrel may have pre-formed teeth which engage with tooth spaces of the mandrel. These materials largely fill the cavity between the cord and the mold tooth space. Additional material may be placed after the cord. When the diaphragm pushes radially inwardly during molding, the material originally above the cord remains above the cord, and the material originally below the cord remains below the cord. This is a compression molding process.

The radially inward transfer molding process uses materials which do not engage or fill the mold tooth spaces. As this material is wound about the mold it is applied chordally from tooth crest to tooth crest of the mold, leaving a cavity at each mold tooth space. In this method, only that material which is intended to be between the cord and the top of the belt tooth space is wound around the mold before the cord. The remaining material, including that which is intended to fill the belt teeth, is wound around the mold after the cord. During molding, the diaphragm pushes radially inward between the cords to fill the tooth spaces of the mold. This is a radially inward transfer molding process. The relative position of the tooth material with respect to the cord is changed during molding. The belt molded in this way is interlocked with the mold and can only be removed axially because the cord prevents radial expansion.

After cure, the end forming ring of the mold is removed and the slab is stripped axially from the mold. While this process has some successful features, it requires the application of large forces to remove the slab from the mold. The use of such large forces can damage both the slab and the mandrel. Further, this process only works with a slab which does not interlock with the mold. This restricts the process to manufacturing slabs of only axial or very simple helical teeth.

The inventive process described herein utilizes a building mandrel as a tool to support and align the belt slab when the slab and mandrel are placed in the mold via registering means incorporated in the mold and mandrel. Another important aspect of the invention utilizes an expandable building mandrel to provide an outwardly radial force to the slab during molding and curing. Another important aspect of the invention utilizes the expanding mandrel to achieve a new outwardly radial transfer molding process to accurately form teeth or ribs on a belt. The teeth may be of such a shape as to be interlocked with the cavities of the mold. The inventive process utilizes a radially inward buckling of the cured slab to allow an interlocking slab to be removed axially from the mold.

The mold contains tooth or rib forming cavities on its inner cylindrical surface. The belt is built inside-out on the outer cylindrical surface of an expandable mandrel. The layers of material are applied to the mandrel in reversed order as compared to radially inward transfer molding. The tooth or rib material is placed on the mandrel prior to the application of the cord. The cord length must be essentially the same for radially inward transfer molding of the current art, radially outward compression molding of the current art, and for radially outward transfer molding of the invention. A thin layer of fabric or other material for lining the teeth may be placed outside the cord.

After all material layers are applied to the slab, the slab and mandrel are placed in the mold as described above. During outwardly radial transfer molding, the tooth or rib material is moved from its position radially inward from the cord by flowing radially outward between the cords.

The outwardly radial transfer molding allows the outside diameter of the inside-out built slab to be smaller than the inside diameter of the mold, permitting the slab to be placed in the mold without first buckling the slab, and eliminating the need to remove the slab from the building mandrel to buckle the slab inward. This aspect of the invention allows the building mandrel to be used to carry and precisely place the built slab in the mold using registering means, thereby providing the greater accuracy necessary to use this process for positive drive synchronous belts, and facilitating automation of moving the slab and placing it in the mold.

When the tooth or rib stock is transfer molded radially outward, the slab may become interlocked to the mold. The expanding building mandrel is removed from the mold, providing room to buckle the slab radially inward to disengage it from the mold cavities, thereby allowing the slab to be removed axially from the mold with minimal force and without risk of damage to the mold or belt slab.

SUMMARY OF THE INVENTION

Still other benefits and advantages of the invention will become apparent to those skilled in the art to which it pertains upon a reading and understanding of the following detailed specification.

In accordance with the practice of the present invention, there is provided a method of manufacturing a synchronous drive belt via transfer molding. The method includes the steps of positioning a belt against an interior surface of a mold via positioning means for positioning the belt. The mold has recesses in the interior surface of the mold. Next, the belt is pressed radially outwardly into the recesses via pressing means for pressing, thereby transfer molding tooth stock in the belt between the cords, and into the recesses in the mold. Next, the belt is cured via curing means for curing and finally the belt is removed from the mold. The belt is removed from the mold by buckling a portion of the belt radially inwardly towards an axis of the mold.

In accordance with another aspect of the present invention, the belt is built on a building means for building. A bladder or diaphragm is mounted on the building means and is in cooperative association therewith. The mandrel can be placed within the mold and accurately positioned via registering means.

According to another aspect of the invention, a method of building a synchronous drive belt includes the steps of positioning a barrier layer radially outwardly of a pressing means for pressing. Next, a tooth stock layer of the belt is positioned radially outwardly of the barrier layer. Next, the tooth stock layer is pressed between the cords and into the recesses of an associated mold by pressing the barrier layer radially outwardly via the pressing means.

According to a still further aspect of the invention, a top elastomer layer is positioned radially outwardly of the pressing means and radially inwardly of the barrier layer. The top elastomer layer has a viscosity different from a viscosity of the tooth stock layer. The viscosities of the top elastomer layer and the tooth stock layer being chosen in order to provide a desired pressure to be applied by the pressing means. The viscosity of the top layer is much greater than the viscosity of the tooth stock layer.

According to a further aspect of the invention, a synchronous drive belt includes a top elastomer layer, a barrier layer which is radially inward of the top elastomer layer, a tensile member layer which is radially inward of the barrier layer. A tooth stock layer being radially inwardly of the belt tensile member layer and tooth facing fabric, the tooth facing fabric being radially inward of the tooth stock elastomer.

According to a further aspect of the invention, a method of building a synchronous drive belt via transfer molding includes the steps of positioning a tooth stock layer of the belt radially outwardly of a contact surface of pressing means for pressing the belt into the recesses of an associated mold. Next, the tooth stock layer is pressed into the recesses of the associated mold by pressing the barrier layer or tooth stock layer radially outwardly via pressing means, the contact surface of the pressing means being uneven, corrugated, ribbed, dimpled, or otherwise not smooth. The pitch or spacing of the corrugations and the depth must be of a size proportional to the other features of the belt so that the belt can perform its intended and desired functions, and so that the corrugations of the pressing means contact the barrier or cord and apply a radial outward force.

According to a further aspect of the invention, an apparatus for building a synchronous drive belt includes a mandrel upon which the belt can be built prior to curing. Later, the mandrel can be placed into a mold for curing the belt. The mandrel has registering means for registering the mandrel relative to the curing means.

According to a further aspect of the invention, the apparatus further includes a diaphragm around the mandrel. The diaphragm has an outer circumference which is selectable adjustable by inflating or deflating the diaphragm.

Still other benefits and advantages of the invention will become apparent to those skilled in the art to which it pertains upon a reading and understanding of the following detailed specification.

Definitions

The invention also may be better understood in the context of the following definitions, which are applicable to both the specification and the appended claims:

"Axial" and "axially" are used herein to refer to lines or directions that are parallel to the axis of rotation of the belt, mold or mandrel.

"Lateral" means an axial direction.

"Radial" and "radially" are used to mean directions radially toward or away from the axis of rotation of a cylinder, such as the mandrel or building drum.

BRIEF DESCRIPTION OF THE DRAWINGS

The invention may take physical form in certain parts and certain arrangement of parts, a preferred embodiment of which will be described in detail in the specification and illustrated in the accompanying drawings, which form a part hereof and wherein.

DETAILED DESCRIPTION OF THE INVENTION

The drawings illustrate a synchronous drive belt and method and apparatus for making the same.

Figure 1:
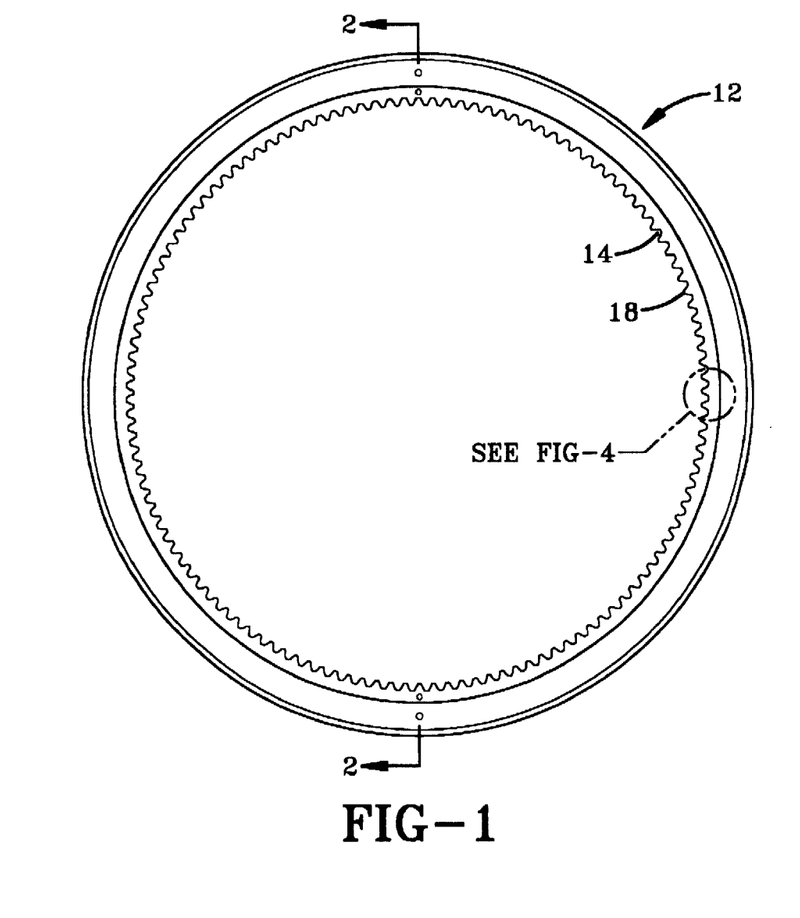
FIG. 1 is an axial view of a mold ring according to the invention with internal helical teeth.
Figure 2:
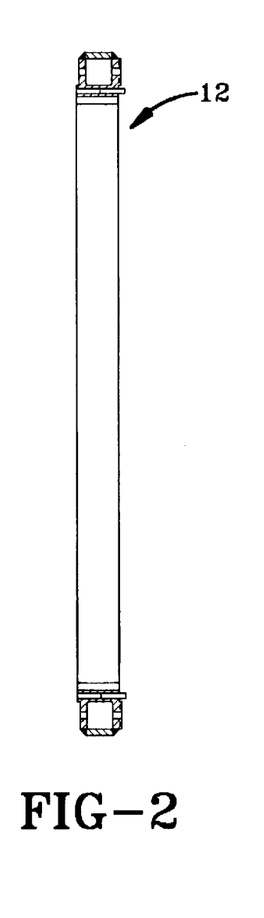
FIG. 2 is a sectional view of the mold ring of FIG. 1 containing the axis of the ring.

With reference to FIGS. 1 and 2, a mold ring 12 according to the invention is disclosed. As is evident from the figures, the mold ring 12 has a plurality of recesses 14 on a radially inward surface 18 of the mold ring 12.

Figure 3:
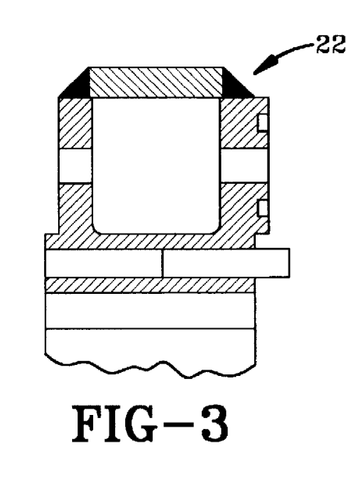
FIG. 3 is an enlarged view of a portion of the mold ring illustrated in FIG. 2.
Figure 4:
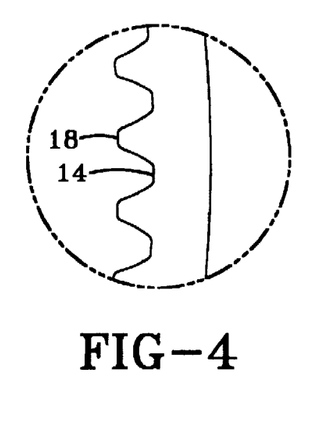
FIG. 4 is an enlarged view of the teeth of the mold ring as illustrated within circle 4—4 of FIG. 1.

With reference to FIGS. 3 and 4, the end portion 22 of the individual mold ring 12 is shown enlarged, as is a portion of the recesses 14 and the radially inward surface 18.

Figure 5:
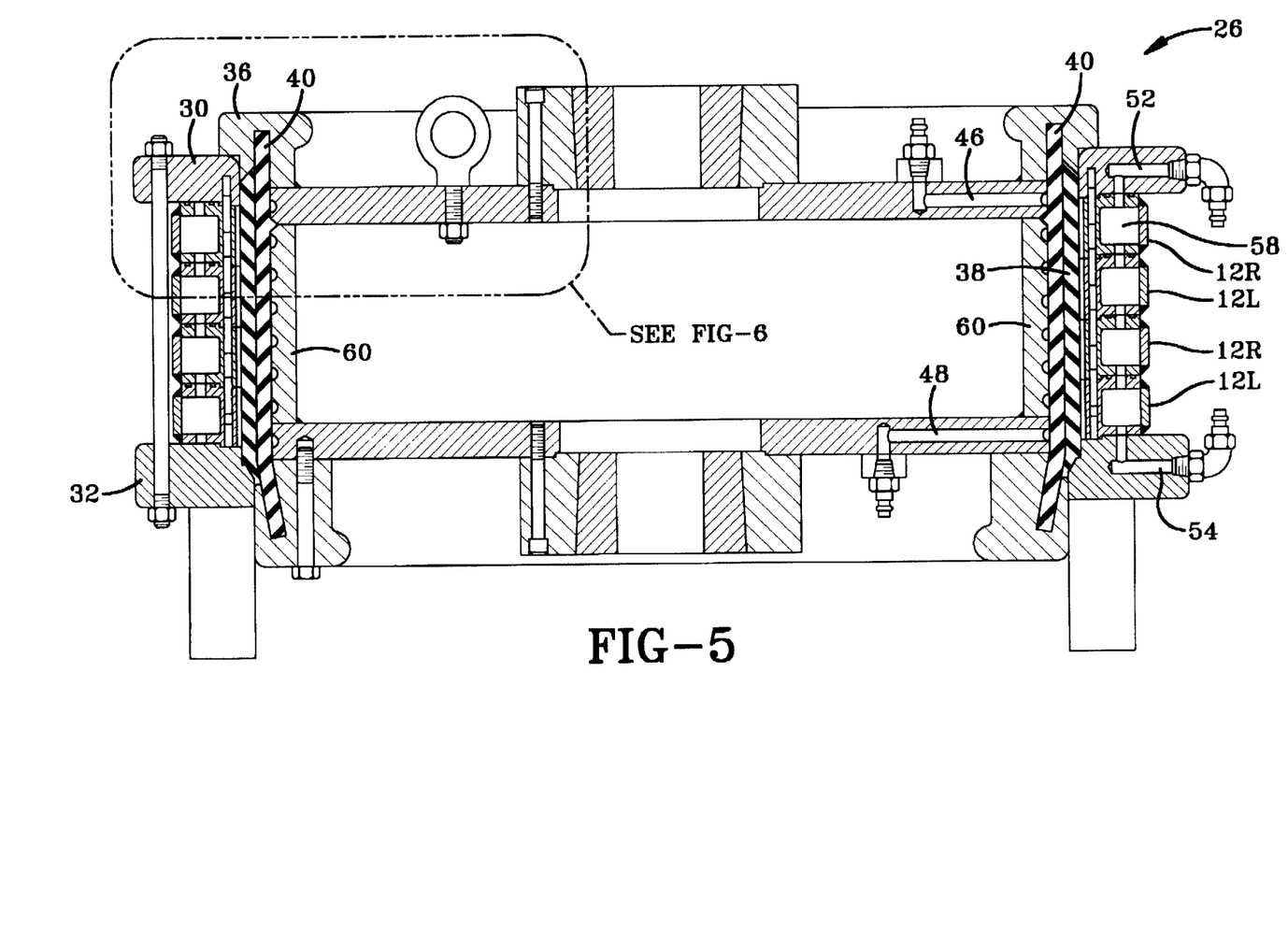
FIG. 5 is a cross-sectional front view of an assembled mold using a stack of rings with internal helical teeth and showing a mating internal part which functions both as a diaphragm retainer and as a compliant building mandrel.

With reference to FIG. 5, a plurality of mold rings 12 are assembled into a mold assembly 26. The mold assembly 26 includes a top end plate 30, a bottom end plate 32, and a can 36. A pressing means for pressing the slab or uncured belt 38 against the mold rings 12 is an inflatable diaphragm 40. The diaphragm 40 can be selectively inflated or deflated by way of a fluid, such as air, steam, or hot water, in conduits 46,48. Likewise, the mold rings 12 can be heated by a way of a heating means, one embodiment of which consists of void areas 58 within each mold ring 12 which can be selectively filled and heated or cooled with fluids supplied through conduits 52,54.

With continued reference to FIG. 5, one of the important features of the invention is the fact that the building mandrel 60 upon which the unvulcanized belt 38 has been constructed is fitted with the diaphragm 40 and is capable of being placed into the mold assembly 26. Previously, the required precision for synchronous timing belts could not be obtained through such a manufacturing technique. The requisite accuracy is now obtainable through registering means for registering the mandrel 60 in proper relationship to the mold rings 12, as well as through the inventive process herein disclosed. The registering means can be seen in FIG. 6 wherein a portion of FIG. 5 has been enlarged.

Figure 6:
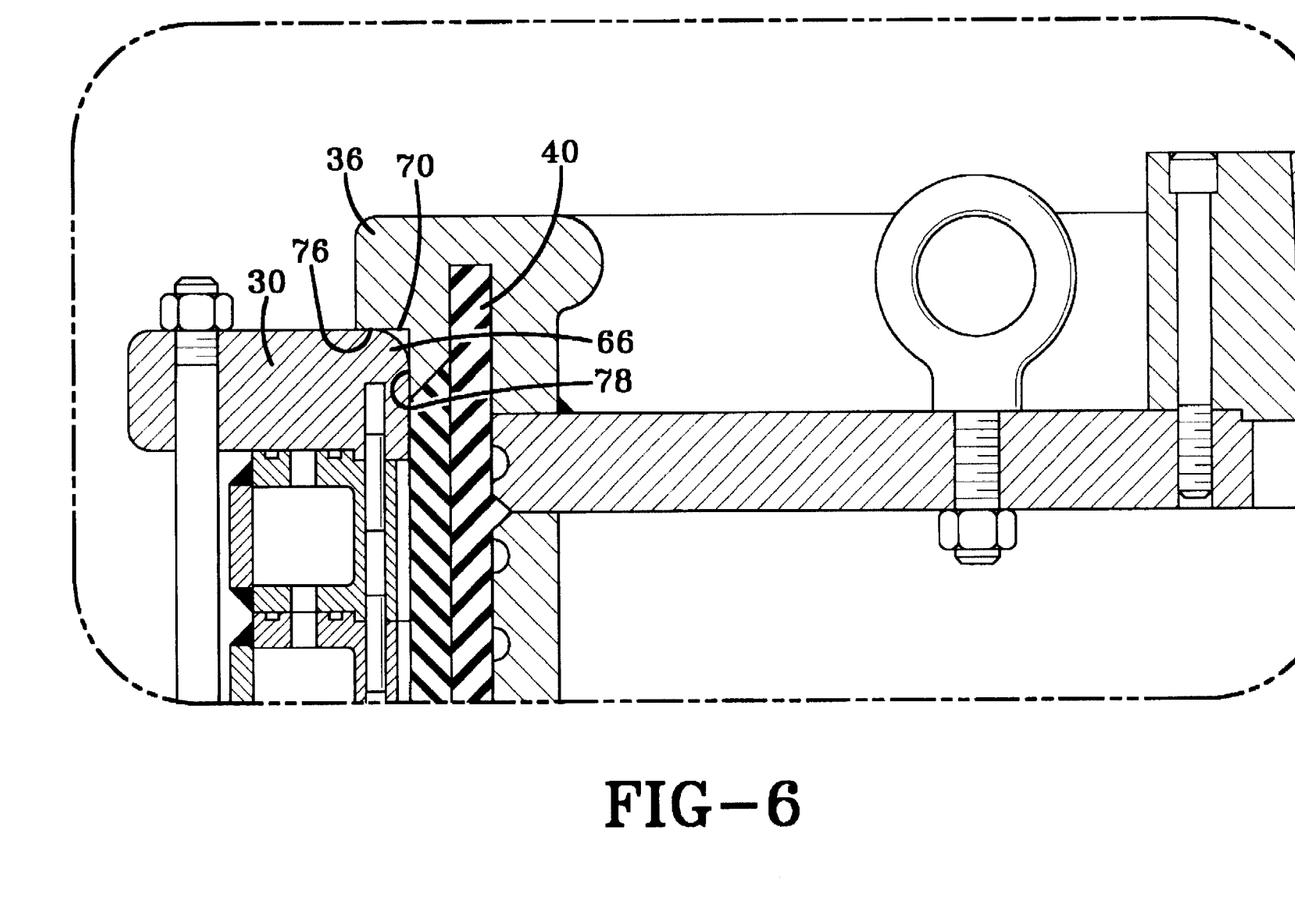
FIG. 6 is an enlarged view of a portion of FIG. 5.

With reference to FIG. 6, the registering means can be seen to comprise a corner of the top end plate which fits into a recess in the can. More specifically, a rounded corner 66 of the top end plate 30 fits into a recess 70 in the can 36. The recess 70 is comprised of two perpendicular surfaces, one surface 76 extending horizontally and one surface 78 extending vertically. By registering corner 66 into recess 70, the top end plate 30 is registered in an axial and radial direction to the can 36 and the rest of the mold assembly 26, the mold rings 12 can be accurately fitted and registered to the building mandrel 60.

The axial and radial positioning of the belt slab in the mold can be adequately carried out via axial and radial positioners. The actual axial positioning is relatively unimportant compared to the allowable tolerances of other areas of the belt. The radial positioning is more important, but still non-critical, because the belt slab and diaphragm are compliant and conform to the mold as the diaphragm presses radially outward.

The most critical aspect to be controlled is the angle between the axis of the mold and the axis of the belt slab as defined by the position of the cord in the belt. If the belt axis and the mold axis are not parallel, the cords will not lie in a uniform helix from one edge of the finished belt to the other. This is the critical alignment which the inventive apparatus and process herein described improves to a new accuracy level above the acceptable limits.

The mechanical registers above-described are one means of aligning the mandrel to the mold, for obtaining concentricity and parallelism between the axes of two rigid cylindrical structures. In this case, the rigid structures are the metal mold and metal mandrel. Actually, the more difficult challenge is defining and accurately controlling the axis of the non-rigid cylinder formed by the cord. The cord is held approximately, but not rigidly, in a helical pattern by the other materials in the unvulcanized belt. When the cord is wound on the mandrel, it can be made to form an accurate helix which is concentric and parallel to the axis of the rigid mandrel. In the prior art methods and apparatus, if and when the belt (and the cord contained in the belt) is released from the mandrel, the alignment is lost and the axis of the belt cannot be easily measured due to the compliant and viscous nature of the unvulcanized belt and its surfaces. But in the inventive method and apparatus, the belt is not released from the mandrel. Therefore, the definition and control of the belt and cord axis is not lost. The belt and mandrel are placed in the mold as an assembly which can be positioned by the rigid register surfaces on the mandrel.

One of the key features of the invention is the fact that the belts are made via a transfer molding process as opposed to compression or injection molding. The terms "transfer molding", "compression molding", and "injection molding" are known in the art and are discussed in various text books and handbooks known in the art, such as *The Vanderbilt Rubber Handbook* as published by the RT Vanderbilt Company, Inc. In this resource, molded and extruded goods manufactured from rubber and plastic are discussed and that portion of the book is incorporated herein by reference.

Barrier Method of Transfer Molding

Figure 7:
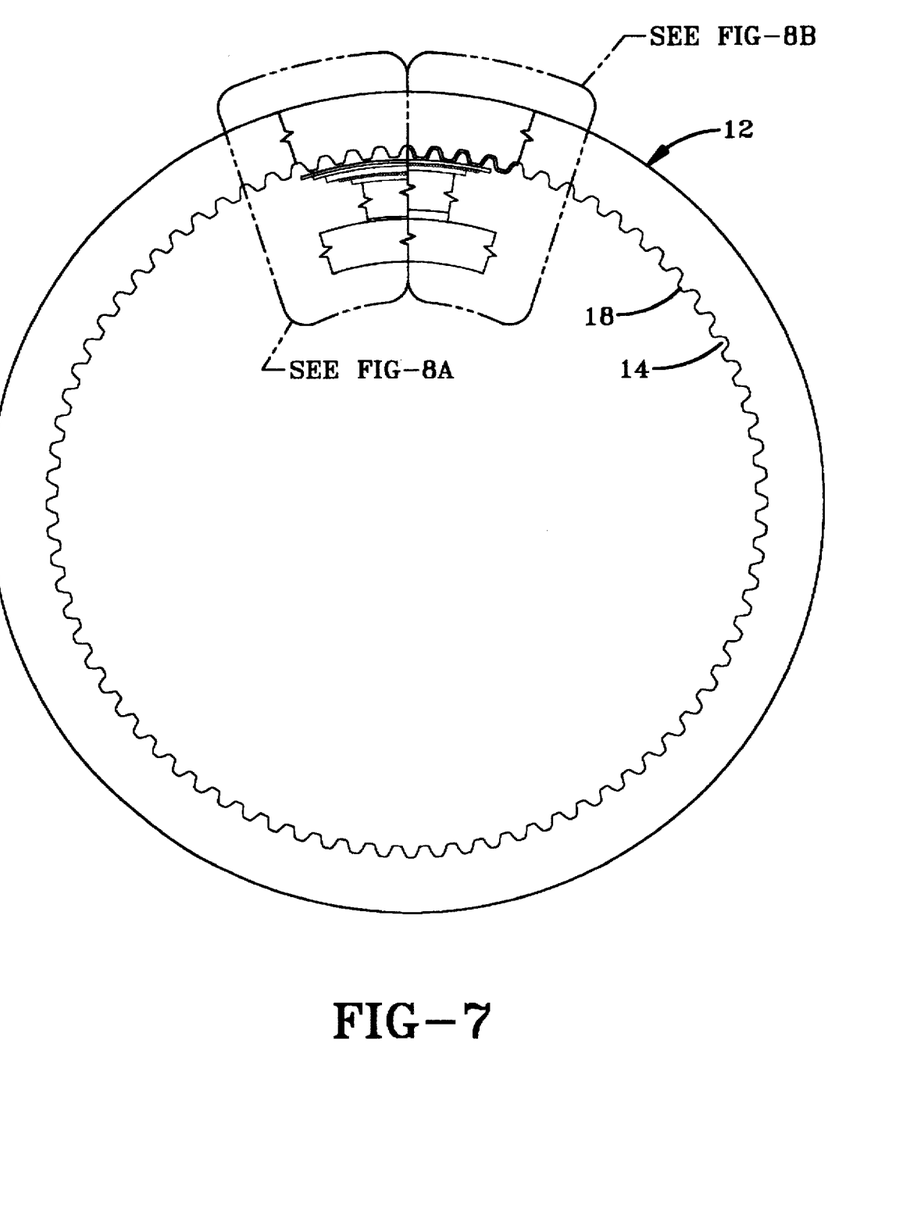
FIG. 7 is a cross-sectional view illustrating one aspect of the inventive method.
Figure 8A:
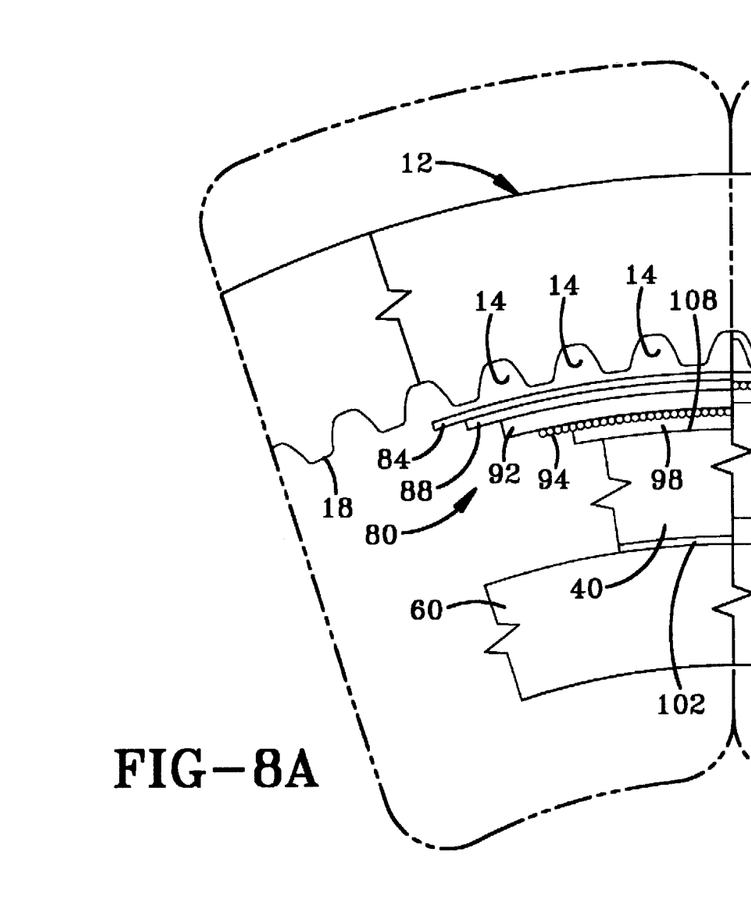
FIG. 8A and 8B is an enlarged view of a portion of FIG. 7.
Figure 8B:
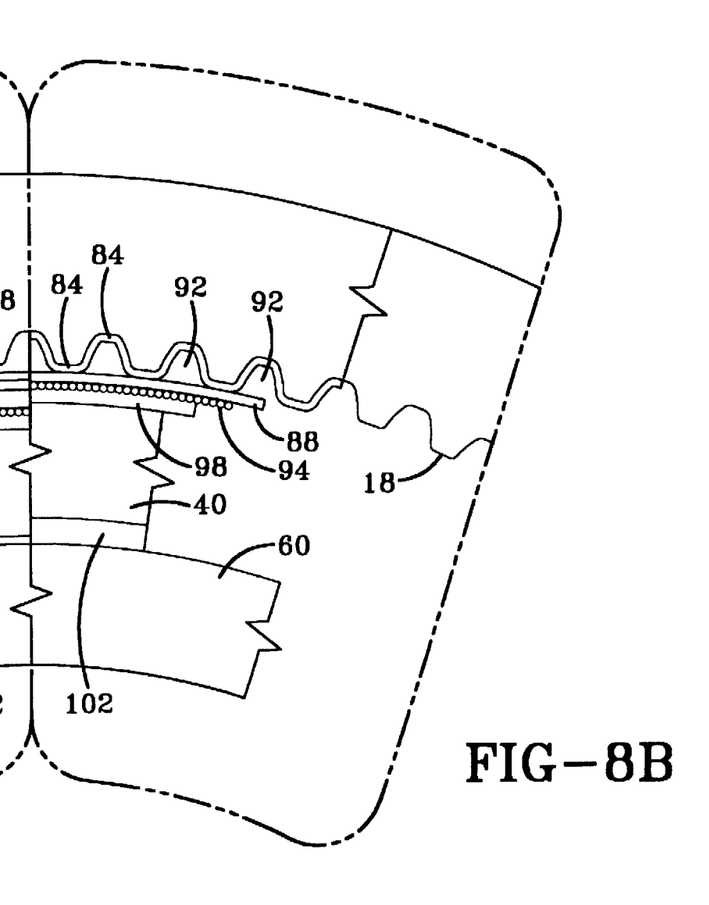

With reference to FIG. 7, a mold ring 12 is illustrated. With reference to FIGS. 8A and 8B, an enlarged portion of FIG. 7 is further illustrated. FIG. 8A indicates the configuration of equipment and belt components prior to the transfer molding process while FIG. 8B indicates the configuration of those structures and components after the transfer molding process has been completed. With reference to FIGS. 8A and 8B, the mold ring 12 includes recesses 14. The unvulcanized belt 80 includes several components. Those components include the tooth facing fabric 84, the belt tensile member cord 88, the tooth stock elastomer 92, the barrier layer 94, and the top elastomer 98. Some of the structure utilized in the curing process further includes the diaphragm 40 and the building mandrel 60. Between the mandrel 60 and the diaphragm 40 is the pressure fluid 102. The barrier layer 94 can be made of tire cord, woven or knit fabric, plastic or elastomeric films, spun-bonded structures with random or oriented filaments, or even wire cloth. The material selected must be compatible with the function of the finished belt, and must perform the desired barrier functions during the transfer molding and vulcanization. The barrier may also be used as a functional structure in the finished belt.

Some synchronous belts require transverse reinforcement in the form of a layer of fabric or tire cord. The purpose of this layer is to carry the axial thrust generated by the angular teeth. The layer can be placed above the tensile member cords 88, below the tensile member cords 88, or both. Placement above the tensile member cords 88 is preferred, in order to keep the pitch line differential (or "PLD") low, but it need not be tight against the tensile member cord 88. If the volume of the tooth facing fabric 84, plus the volume of the tooth stock elastomer 92 is less than 100% of the volume of the mold recesses plus the volume between the cords of the tensile member cord layer, the barrier layer 94 will move closer and actually come in contact with the tensile member cords 88 during transfer molding and cure. If the barrier layer 94 offers no resistance to flow, the balance of the 100% volume will be made up from top elastomer 98 flowing through the barrier layer 94 at approximately the same pressure as that resulting from the flow of the tooth stock elastomer 92 between the tensile member cords 88.

If the size of the orifices in the barrier layer 94 are reduced, or if the viscosity of the tooth stock elastomer 92 or the top elastomer 98 is increased, the barrier layer 94 increases the pressure applied to the cord while the tooth stock is flowing through the cords. This increased pressure can be transferred to the tensile member cord 88 by the barrier layer 94, which can force it outward against the mold 12 and the tooth facing fabric 84 within its limits of elasticity. If the tooth stock volume is less than 100% of the cavity volume, the barrier will come into contact with the cord. If the size of the orifices in the barrier layer 94 are reduced, or if the viscosity of the top elastomer 98 is increased, the barrier layer 94 will increase the pressure at which the top elastomer 98 will flow.

Many of the materials used in belts are thermoplastic to some extent, and some may be viscoelastic. Other materials may contain fabric or fibers. Most belt materials exhibit non-Newtonian flow characteristics as well, so specifying the dynamic or kinematic viscosity range is not appropriate. The key aspect is relative flow behavior of the tooth stock layer through the cord and of the top layer through the barrier to achieve the application of a radial outward force on the cord while completely filling the tooth spaces of the mold with the desired material.

While rheometers can measure the respective viscosities of a prospective tooth stock layer and top layer, they cannot determine the acceptability of the two materials because the application depends on the geometry of the cord and the geometry of the barrier. The ultimate test is the volume of tooth stock which flows through a certain cord pattern at a given pressure, compared to the volume of top layer which flows through a given barrier at the same pressure, temperature and time. In other words, the useful ratio would be the resistance to flow of the tooth stock passing between the cords, relative to the resistance to flow of the top layer passing through the barrier layer. This in turn depends on the dimensions and spacing of the passages between the cords, and on the dimensions and spacing of the holes (if any) in the barrier layer, and on the strength of the barrier layer.

When the viscosity of the top layer is much greater than the viscosity of the tooth stock layer, the belt designer has the greatest latitude in the selection of a barrier material. The difference in viscosity is often constrained by other requirements of the belt so that the holes in the barrier must in general be much smaller than the spaces between the cords. The upper limit for the viscosity of the top layer is determined by the volumetric accuracy of the mold tooth spaces and the tooth stock layer. The top layer and barrier must flow or deform at least enough to completely fill the mold tooth space within a range of acceptable tooth stock volumes or thicknesses. The thickness of the tooth stock layer might vary by 0.001 inches to 0.012 inches, depending on how it is created. The barrier layer and top layer must accommodate this variation.

This last feature is important because it gives the possibility of making synchronous belts with small differences in cord length while using a single mold. This process is useful for fine tuning the manufacturing process, compensating for variations and materials, or for making special length belts for critical applications without special tooling.

FIG. 8A represents the location of the belt components prior to the transfer molding process. With reference to FIG. 8B, the belt components are shown after the transfer molding process is complete. The tooth facing fabric 84 has been moved into the recess 14. The tooth stock elastomer 92 has been pushed into the recesses 14. The belt tensile member cord 88, the barrier layer 94, and the top elastomer have the configurations indicated in FIG. 8B. The diaphragm 40 has moved toward the radially inward surface of the mold ring 12. The pressure fluid 102 has expanded somewhat. The building mandrel 60 has not changed location. It is important to notice, as is easily seen when comparing FIG. 8A to FIG. 8B, that the tooth stock elastomer 92 has moved through the belt tensile member cord 88 during the transfer molding process.

Corrugated Diaphragm Method

Figure 9:
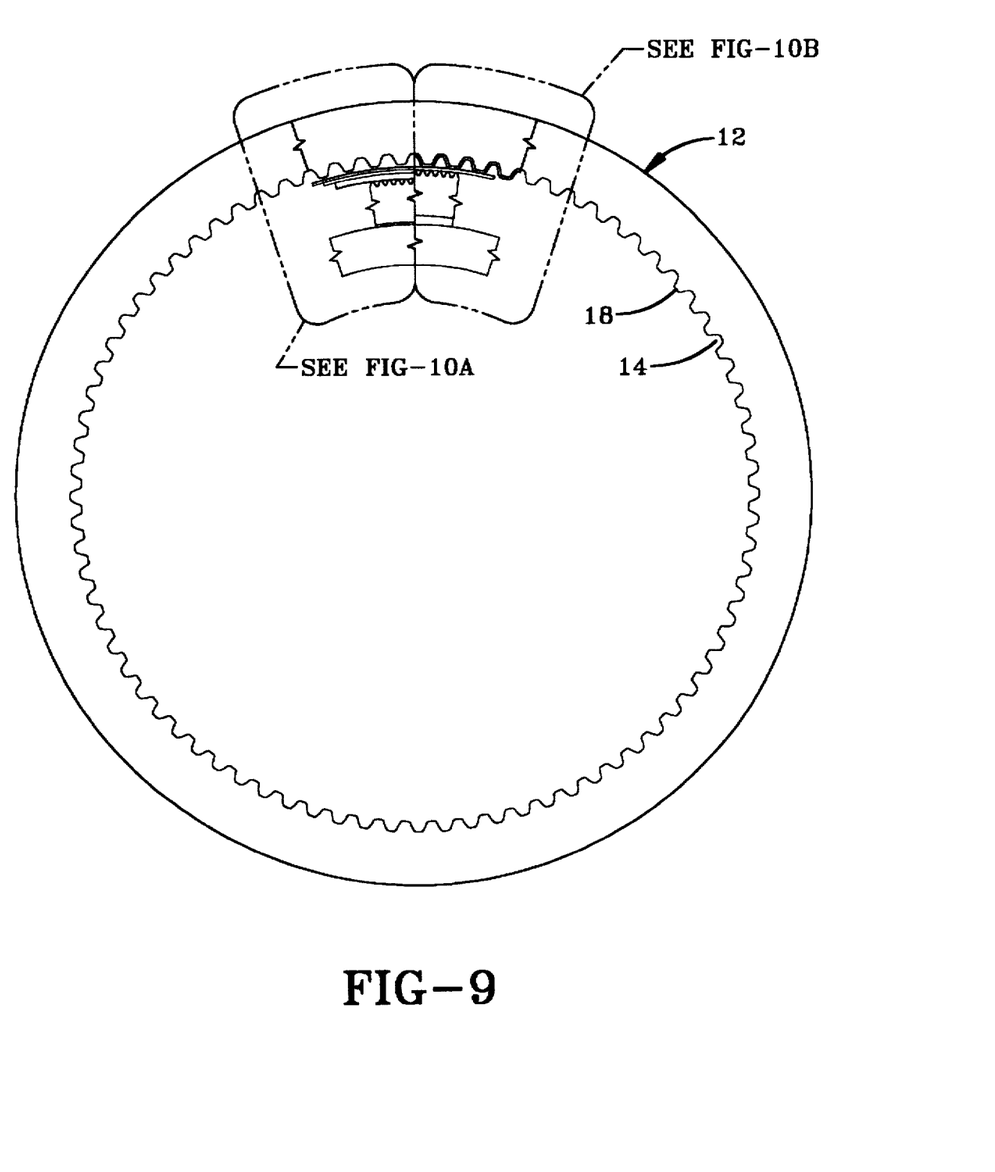
FIG. 9 is a schematic view of a portion of the inventive method.

With reference to FIG. 9, an alternate method of transfer molding a synchronous drive belt is illustrated.

Figure 10A:
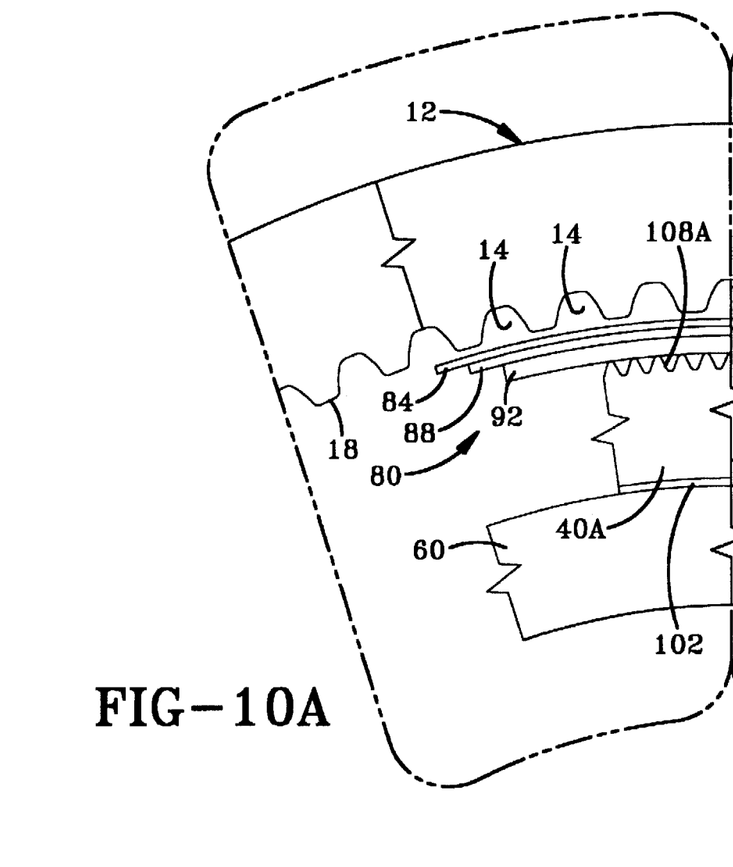
FIG. 10A and 10B is an enlarged portion of FIG. 9.
Figure 10B:
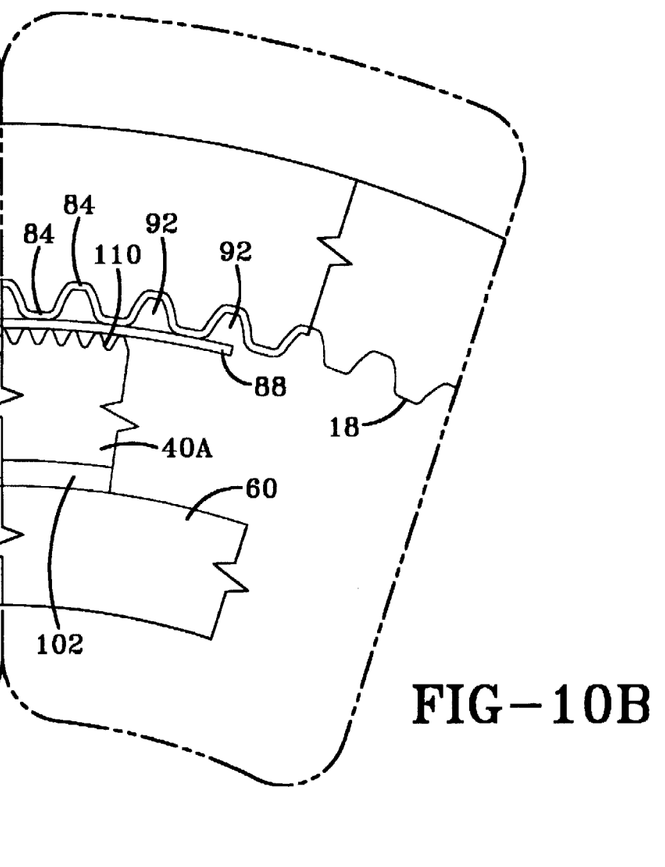

With reference to FIGS. 10A and 10B, an enlarged view of FIG. 9 is illustrated. FIG. 10A illustrates the orientation of various belt components and molding structures prior to the transfer molding process. While FIG. 10B illustrates the configuration of those components and structures after the transfer molding process is complete. With reference to FIG. 10A, the structures and elements of FIGS. 10A and 10B which are the same as those elements and components as illustrated in FIGS. 8A and 8B have been given the same numbers. The primary difference concerns diaphragm 40A. In FIGS. 8A and 8B, the diaphragm 40 has a smooth radially outward surface 108. However, in the diaphragm 40A as illustrated in FIGS. 10A and 10B, the radially outward surface 108A of the diaphragm 40A is corrugated.

The depth of the corrugations 110 in the diaphragm 40A is set to approximately equal the desired thickness of the elastomer layer which lies above the belt tensile member cord 88 in the finished belt 80. The volume of the tooth facing fabric 84, plus the volume of the elastomer 92 placed between the belt tensile member cord 88 and the diaphragm 40A must equal the volume of the recesses 14 plus the voids between the belt tensile member cords 88 plus the volume between the corrugations 110 in the corrugated diaphragm 40A. The elastomer layer 92 may consist of one homogeneous material, or may be made up of layers of material with desired properties useful in the belt. The diaphragm 40A must be stiffer than the tooth stock elastomer 92 so that its tooth form is not distorted by pressure induced during the cure. The inward radial retracting stroke of the diaphragm 40A after the cure must be greater than the depth of the corrugations 110 unless the corrugations have a uniform cross-section in the axial direction. Otherwise, they will prevent axial removal of the diaphragm 40A and mandrel 60 from the cured belt 80.

The advantages of this corrugated diaphragm method include a more flexible belt and less material consumed. The disadvantages is the resulting corrugated backside of the belt 80, which may be undesirable in some applications.

To the applicant's knowledge, the application of the corrugated diaphragm method of construction when used in a radially outward transfer molding application is novel.

The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

It is claimed:

1. A method of producing a synchronous drive belt having a plurality of teeth extending obliquely to a longitudinal direction in an associated mold having corresponding tooth-forming recesses therein, the method comprising the steps of:

providing an associated building means for building a belt slab, file associated building means including a pressing means for pressing the belt slab radially outwardly;

building the belt slab on said associated building means by positioning a top elastomer layer radially outwardly of the pressing means, positioning a tooth stock layer radially outwardly of the top elastomer layer, positioning a barrier layer between the top elastomer layer and the tooth stock layer, the barrier layer having a plurality of orifices therein, and positioning a tensile member layer radially outwardly of the tooth stock layer, the tensile member layer including a wound cord having spaces between successive windings;

mounting the building means within the associated mold so that the belt slab is positioned against an interior surface of the mold via positioning means for positioning the belt slab;

providing heating means for heating the belt slab to soften the tooth stock layer;

utilizing the pressing means to press the belt slab radially outwardly so that the barrier layer forces the softened tooth stock layer to flow through the spaces in the tensile member layer and into the tooth-forming recesses in the associated mold and forces the tensile member layer into a position adjacent the inner surface of the mold, and a portion of the top elastomer layer is forced through the orifices in the barrier layer, a size of the orifices being chosen in order to provide a desired flow of the top elastomer layer; and, curing the belt slab.

2. The method of claim 1 further comprising the step of removing the cured belt from the mold by buckling a portion of the belt radially inwardly toward an axis of the mold.

3. The method of claim 1 wherein the pressing means is an inflatable diaphragm and wherein the step of utilizing the pressing means includes inflating the diaphragm.

4. The method of claim 1 wherein the positioning means comprises:

a pair of intersecting perpendicular surfaces on the building means forming a recesses; and, an extension of the mold which is received into the recess of the building means, and wherein the step of mounting the building means within the associated mold includes receiving the mold extension into the recess in order to establish axial parallelism between the belt slab and the associated mold.

5. The method of claim 1 wherein the step of building the belt slab further comprises:

positioning a tooth facing fabric layer radially outwardly of the tensile member layer.

6. The method of claim 1 wherein the top elastomer layer has a viscosity different from a viscosity of the tooth stock layer, the viscosities of the top elastomer layer and the tooth stock layer being chosen in order to provide a desired relative flow of the tooth stock layer to the top elastomer layer during the step of utilizing the pressing means.

7. The method of claim 1 wherein a radially outward surface of the pressing means is uneven.

8. The method of claim 7 wherein the radially outward surface of the pressing means is corrugated.

9. The method of claim 7 wherein the radially outward surface of the pressing means has ribs.

10. The method of claim 7 wherein the radially outward surface of the pressing means is dimpled.

* * * * *